Patented Sept. 25, 1951

2,568,966

UNITED STATES PATENT OFFICE 2,568,966

4-p-CHLOROBENZOYLAMINOANTHRA-QUINONEBENZACRIDONE

Eduard Mörgeli, Neue Welt, near Basel, and Walter Kern, Sissach, Switzerland, assignors to Ciba Limited, Basel, Switzerland, a Swiss firm No Drawing. Application March 9, 1945, Serial No. 581,969. In Switzerland December 28, 1943

Section 1, Public Law 690, August 8, 1946
Patent expires December 28, 1963

1 Claim. (Cl. 260—277)

Anthraquinone acridones are a well-known class of compounds, and in particular 4-benzoylamino anthraquinone 2,1-(N)-benzacridone is an old dyestuff. It is defective, however, in some fastness properties and therefore scarcely used nowadays. Further research has been devoted to this class of dyestuffs, and it is interesting to see that all experts have been convinced that an improvement should be brought about by suitably substituting the benzene radical fused on to the acridone ring. Numerous proposals to this end have been made. The trouble is, however, that by such substitutions the shade is normally displaced towards the violet side, and this is unfavorable, because blue to greenish blue dyestuffs are somewhat rare in the anthraquinone acridone series.

It is an object of the present invention to show that very valuable results can be obtained by effecting comparatively small changes not in the benzene radical fused on to the acridone ring, but in the acyl radical attached to the amino group in 4-position. Further objects will appear as the specification proceeds.

It has been found that valuable vat dyestuffs are obtained by acylation of 4-aminoanthraquinone-2:1-(N)-benzacridones whose benzene nucleus attached to the acridone ring is free from halogen, when using as acylating agents benzoic acids substituted in para-position by halogen or their functional derivatives.

The 4-aminoanthraquinone-2:1-(N)-benzacridones serving as parent materials for the present process, in which the bz-nucleus must be free from halogen, can for example be altogether free from substituents in the bz-nucleus. According to the present process there are used for the acylation of such compounds para-halogenbenzoic acids or their functional derivatives, preferably acid halides. Among these acids there are to be mentioned especially those which contain chlorine or bromine in para-position to the carboxyl group, further also such acids which contain also further substituents, for example a further halogen atom besides the said halogen atom. For example, 4-chloro-, 4-bromo-, 4-iodo- and 4-fluorbenzoic acid as well as 3:4-dichlorobenzoic acid can be used.

The present process can be carried out in such a manner that a 4-amino-anthraquinone-2:1-(N)-benzacridone free from halogen in the bz-nucleus is caused to react with a para-halogenbenzoyl halide. It is advantageous to work in an indifferent solvent, such as nitrobenzene or dichlorobenzene and in the heat.

The resulting dyestuffs can be further treated with agents introducing substituents, for example agents yielding halogen.

According to the present process there are obtained vat dyestuffs which can be used in known manner for dyeing and printing the most different materials, such as animal fibers and especially fibers containing cellulose. These dyestuffs can also be converted into the corresponding leuco ester salts and used in such a form for dyeing and printing.

The following examples illustrate the invention, the parts being by weight:

Example 1

6 parts of 4-amino-anthraquinone-2:1-(N)-1':2'-(N)-benzacridone and 6 parts of para-bromobenzoylchloride are heated for 1 hour to 150–160° C. in 200 parts of ortho-dichlorobenzene. The whole is allowed to cool and the blue dyestuff is filtered off. It has the formula:

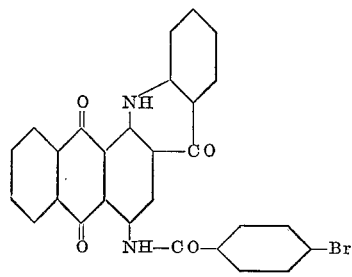

The dyestuff dyes vegetable fibers from a red-violet hydrosulfite vat deep blue shades possessing excellent fastness properties. In concentrated sulfuric acid it dissolves to a yellow-red solution.

When using para-chlorobenzoylchloride in excess or in theoretical quantity instead of para-bromobenzoylchloride, there is also obtained a blue dyestuff possessing excellent fastness properties.

Somewhat more reddish blue shades are obtained when allowing para-fluorbenzoylchloride to act on 4-amino-anthraquinone-2:1-(N)-1':2'-(N)-benzacridone.

Example 2

3.4 parts of 4-amino-anthraquinone-2:1-(N)-1':2'-(N)-benzacridone and 3.2 parts of para-iodobenzoylchloride are heated in 104 parts of ortho-dichlorobenzene to 140–150° C. After 1 hour the whole is allowed to cool to room temperature and the dyestuff which has crystallized in blue needles is filtered off. It corresponds to the formula:

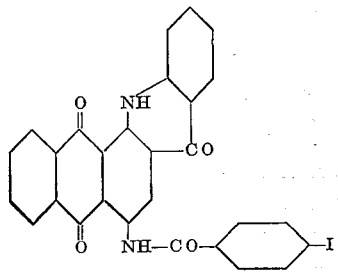

dissolves in concentrated sulfuric acid to a yellow red solution and dyes cotton from a red-violet vat blue shades. The clear, powerful dyeings are characterized by good fastness properties.

*Example 3*

3 parts of 3:4-dichlorobenzoic acid are stirred with 104 parts of ortho-dichlorobenzene containing 2 drops of pyridine. 8 parts of thionylchloride are added to the mixture which is then gradually heated to boiling in a reflux apparatus. As soon as the formation of the acid chloride is complete, the thionyl chloride in excess is distilled with a small quantity of solvent, and after cooling to about 90° C., 3.4 parts of 4-amino-anthraquinone-2:1-(N)-1'2'-(N)-benzacridone are added to the solution. The solution is stirred for 1 hour at 130–140° C. and the dyestuff of the formula:

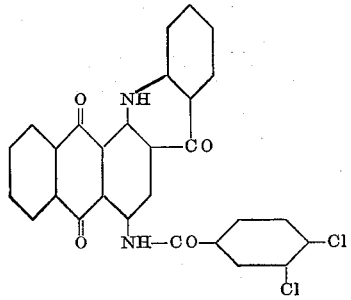

is worked up as indicated in Example 2.

The dyestuff which has crystallized in blue needles dyes cotton from a violet vat fast blue shades. When replacing in this example the 3:4-dichlorobenzoic acid by the corresponding bromide compound, there is obtained a dyestuff having similar properties.

*Example 4*

2 parts of the dyestuff obtained according to Example 1, first and second paragraphs, are stirred with 200 parts of water and 8 parts of caustic soda solution of 36° Bé. and vatted by addition of 4 parts of sodium hydrosulfite at about 50° C. This stock vat is added to a dyebath consisting of 3000 parts of water, 7 parts of caustic soda solution of 36° Bé. and 3.5 parts of sodium hydrosulfite. 100 parts of cotton or viscose rayon are entered at about 40° C., 60 parts of common salt are added after ¼ hour and dyeing is continued for 1 hour at 40–50° C. The material is squeezed out as usual, oxidized and finished. Dyeing can also be carried out at a lower temperature, for example at 25–30° C. The material is dyed fast blue shades.

The dyestuff is also suitable for printing according to the usual potash printing process.

What we claim is:

The vat dyestuff of the formula:

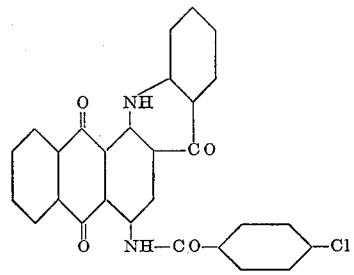

EDUARD MÖRGELI.
WALTER KERN.

REFERENCES CITED

The following references are of record in the file of this patent:

UNITED STATES PATENTS

| Number | Name | Date |
|---|---|---|
| 1,002,270 | Hessenland | Sept. 5, 1911 |
| 1,008,908 | Herzberg et al. | Nov. 14, 1911 |
| 2,005,321 | Kunz | June 18, 1935 |
| 2,165,618 | Dettwyler | July 11, 1939 |
| 2,185,140 | Bauer | Dec. 26, 1939 |
| 2,204,232 | Schlichenmaier et al. | June 11, 1940 |
| 2,266,782 | Lulek | Dec. 23, 1941 |

OTHER REFERENCES

Barnett: "Anthracene and Anthraquinone" (Van Nostrand, New York; 1921), pages 312 and 313.